United States Patent Office 3,336,557
Patented Aug. 15, 1967

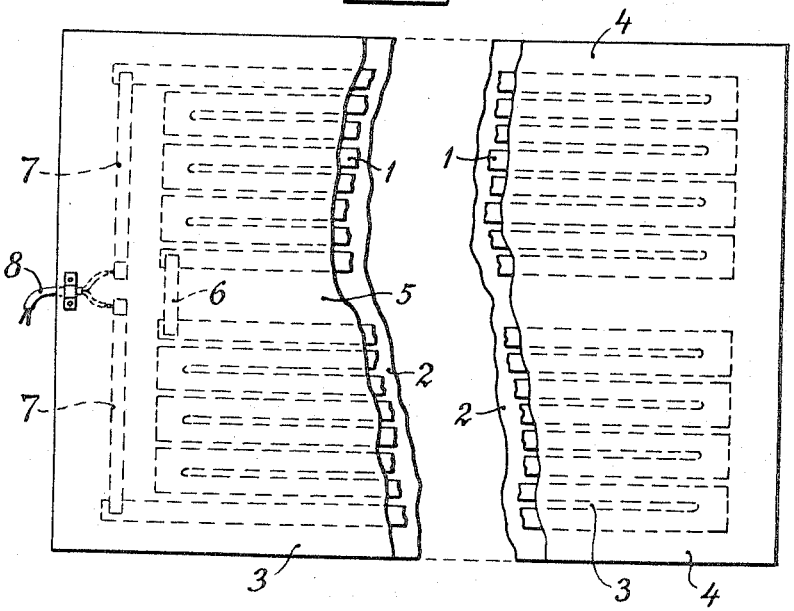
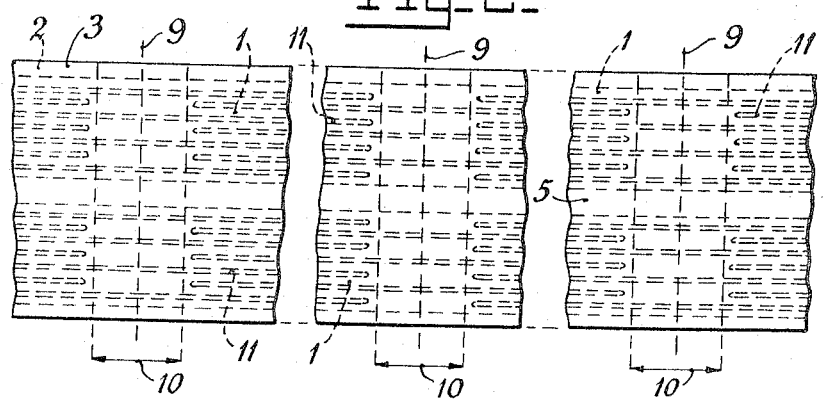
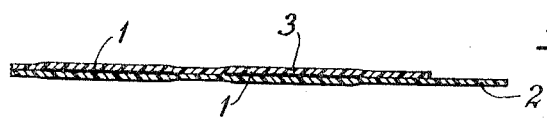

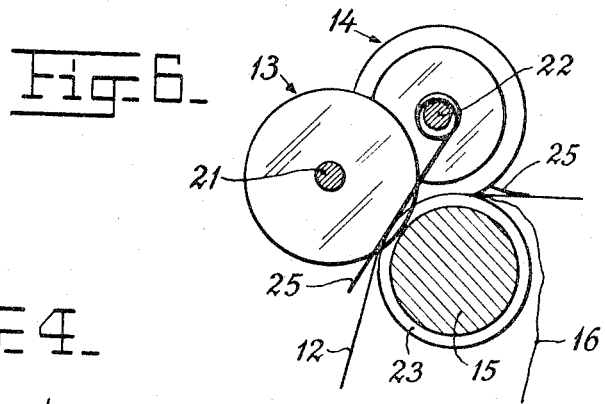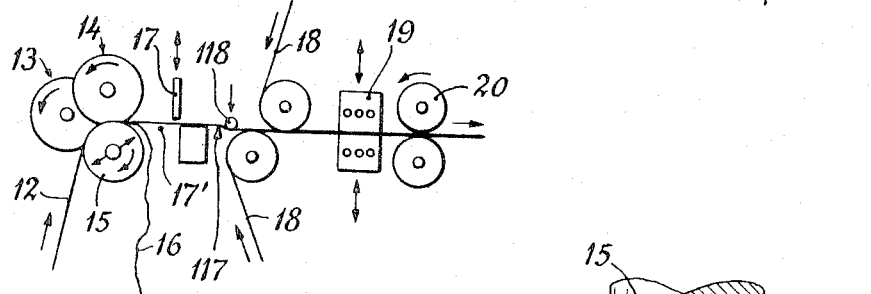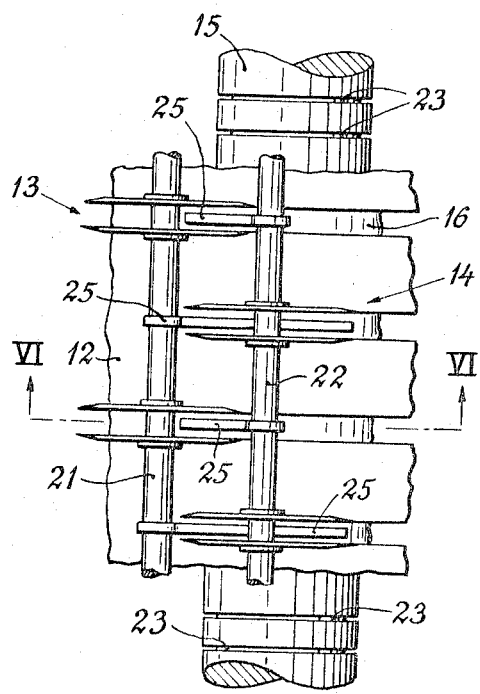

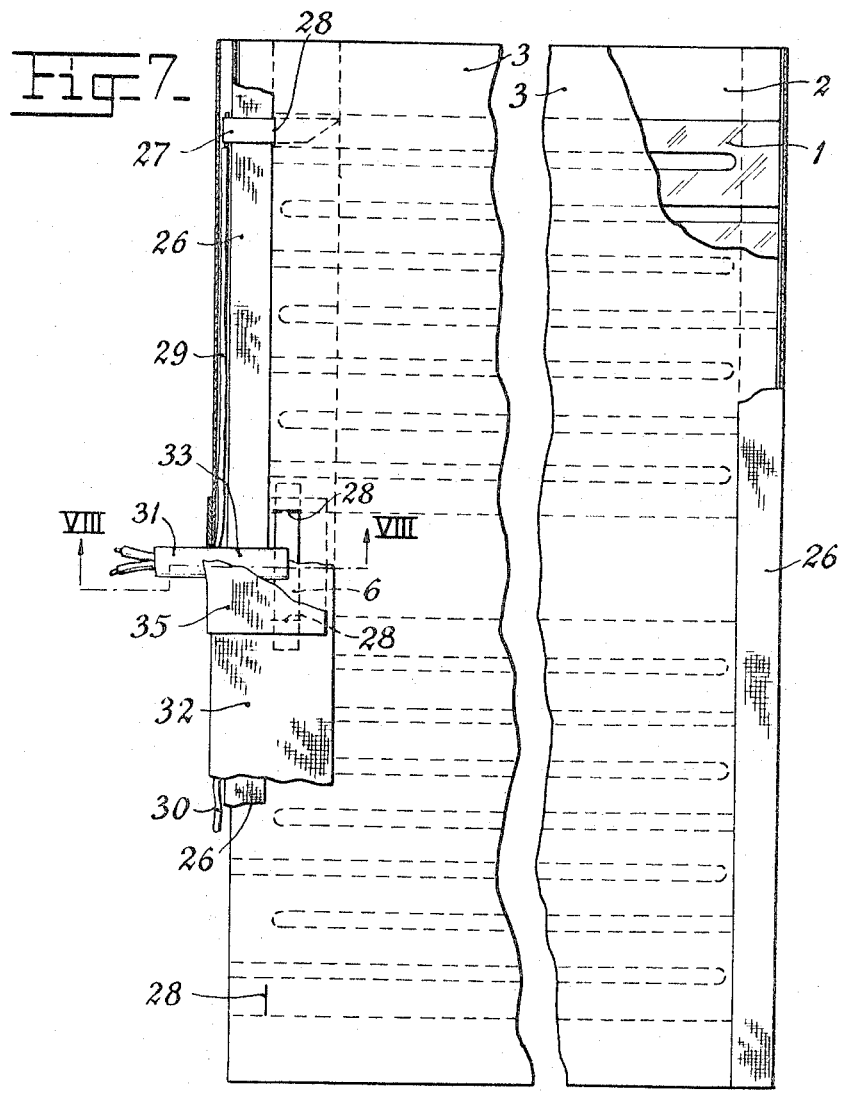

3,336,557
ELECTRICAL HEATING MATS AND BLANKS THEREFOR
Olav Gerhard Lund, Oslo, and Erik Bjerkeseth, Bekkestua, Norway, assignors to Robert Meinich, Oslo, Norway
Original application Nov. 4, 1963, Ser. No. 321,721, now Patent No. 3,263,307, dated Aug. 2, 1966. Divided and this application Mar. 4, 1966, Ser. No. 534,565
Claims priority, application Norway, Nov. 9, 1962, 146,372
7 Claims. (Cl. 338—210)

The present invention relates to thin, flexible mat-like electric heating elements for the heating of rooms by radiant heat, especially elements of the kind adapted to be mounted in the ceiling, the walls or the floor of the room to be heated, this application being a division of applicants' co-pending application Ser. No. 321,721, filed Nov. 4, 1963, now Patent No. 3,263,307.

Known designs of such heating elements or mats comprise a resistor consisting of metal wire or foil of suitable electric resistivity attached to a supporting layer of insulating material and mostly covered by a protecting layer of impregnated paper or the like for protection against mechanical damage, water etc. and/or for electrical insulation. In order to avoid any risk of fire and to make the heating comfortable it is important that the heating elements shall operate with a low over-temperature and cover relatively large areas of the surfaces confining the room, for instance the ceiling, so as to provide the necessary heating power with a lower power consumption per unit of area covered, for instance about 100 to 200 w./m.$^2$.

The heating elements should have a relatively high covering factor (area covered by the resistor divided by the total area covered by the heating element) in order not to cause a high local heating. For these and other reasons metal foil is preferred for the resistor for coilable heating elements. However, such a resistor will have to extend in tortuous paths in order to afford the necessary electric resistance, especially if each mat or a few mats in series are to be connected directly to the mains voltage of for instance 220 v. Such a tortuous path of a thin metal foil in a heating mat of several square meters entails considerable problems in its production.

The reason for these difficulties in the production of a heating element where the supporting layer is flexible and the resistor extends in tortuous paths is the very small thickness which must be used for the foil, inter alia for economic reasons, and which makes it fragile and difficult to handle.

In accordance with a previous proposal (see the British patent specification No. 863,928) there may be produced a heating element having a resistance foil extending in a tortuous path by pasting a narrow foil strip onto a flexible supporting material in the desired pattern. The above mentioned difficulties due to the small thickness of the foil strip are overcome by means of a layer of flexible insulating sheet material which is glued to the foil before it is applied to the supporting material, so as to form, together with the foil, a continuous strip which is considerably stronger and easier to handle than the foil strip alone. The insulating reinforcement strip also overcomes certain difficulties in the folding of the foil strip, such folding being necessary at the places of abrupt changes in direction of the tortuous path. However, time consuming manual work is involved in pasting the resistor onto the supporting material in a tortuous path.

Another proposal consists in gluing a foil sheet of approximately the same size as the finished mat to a supporting layer and thereafter cutting transverse slots in the foil from two opposite edges alternately, so as to produce sinuous windings. Thus, the difficulties in handling a very thin pre-cut foil are avoided. In actual production, however, it will be extremely difficult to make the slots in the foil without risk of damaging the supporting layer if this layer consists of a thin flexible sheet material, such as a sheet of paper or plastic.

The present invention relates to electric heating elements consisting of a resistance foil extending in sinuous windings between two interconnected layers of flexible insulating sheet material, and an object of the invention is to provide a product which may be manufactured by mechanical means very rapidly and in a completely satisfactory manner.

The present invention is characterized by a coilable blank, or heating mats made therefrom, same being in the form of a composite sheet forming an insulated low temperature electrical heating element and comprising a sheet of thin resistance foil of uniform thickness, the sheet material being removed in a first set of numerous narrow parallel slots of uniform width extending from one end of the foil over the major part of the length of the foil, and also in a second set of similar slots extending from the end of the foil opposite of the said one end and in between the slots of the first set, the slots serving to define sinuous windings of the foil of uniform width, and two sheets of flexible, insulating material of a width greater than that of the resistance foil sheet and covering each surface thereof, the insulating webs being adhered to each other through the slots of the resistance foil and outside the lateral edges thereof to form the flexible composite sheet, the windings of the foil, however, being substantially free of the adhesion to the insulating webs.

When surrounding the resistor in this way it is not necessary for the insulating material to adhere to the resistor. On the contrary, it is preferable that the insulating sheets do not adhere to the resistance foil, or adhere to it only to a relatively small extent, whereby greater flexibility and better possibilities for mending may be achieved. Thus, the insulating sheets should be sealed merely to each other through the slots and outside the edges of the resistance foil, and it is therefore advantageous to make the insulating sheets of a material which is heat-sealable to itself. The sheets are then sealed by application of heat and pressure to the superimposed layers. In order to provide desired heat conducting and electric insulation properties, and also in order not to risk that the surface of the finished heating elements becomes sticky, it may be advantageous if the outermost layer of the insulating sheet is not heat-sealable. Thus, as insulating sheets there may be used flexible foils of an electrically insulating plastic laminate, which is heat-sealable on one side only and is applied to the resistance foil with this side.

The slots, which are periodically interrupted over short areas, may be made in any suitable manner. Thus, it is possible to make cuts along both edges of the slots so as to produce strips which are severed at both ends of the slots. This cutting along the edges of the slots may for instance be made by knives or by means of a heated wire which melts the material. It is also contemplated to destroy the foil material over the entire width of the slot, for instance by melting.

The invention will now be further described, reference being had to the accompanying drawings.

In the drawings:

FIG. 1 is a plan view of a heating element made in accordance with the invention.

FIG. 2 shows a continuous composite web made in accordance with the invention and suited for the production of a heating element as shown in FIG. 1.

FIG. 3 is a view near an edge of a heating element showing the insulating sheets in cross-section and laterally off-set as per one example of the construction.

FIG. 4 illustrates diagrammatically a method for the production of a composite web as shown in FIG. 2.

FIG. 5 illustrates a detail of an apparatus for carrying out the method according to the invention.

FIG. 6 is a section along the line VI—VI in FIG. 5.

FIG. 7 is a plan view with certain parts cut away, of a heating element similar to the one in FIG. 1, but of another construction at the ends, which construction makes the heating element still better suited for being produced from the continuous composite web.

FIG. 8 is a section on a considerably enlarged scale along the line VIII—VIII in FIG. 7.

In FIG. 1, 1 is a resistance foil extending in sinuous windings and surrounded by two layers 2 and 3 of a plastic laminate which is heat-sealable on one side. In order to achieve a satisfactory covering factor, the distance between the longitudinal runs of the windings is as small as possible, regard being had to the insulating requirements. To make room for fastening means such as nails or the like, so that these may be passed through the heating elements with the least possible risk of damaging the resistance foil, relatively broad areas 4 along the edges of the heating element and one or more longitudinal areas 5 are not covered by resistance foil. The width of the heating element and the distance between the open areas 5 are preferably chosen in accordance with modules commonly used in buildings, so as to correspond to the positioning of pegwoods or other means for attaching the heating elements.

The resistor in FIG. 1 consists of two separate parts, each of which is coherent, and which are connected by a copper strip 6. The other ends of the resistor 1 are connected to an electric cable 8 by means of copper strips 7. In order to achieve a good galvanic connection and avoid local over-heating it is preferred to use some sort of soldering process. Apart from having the desired resistivity and flexibility the foil material should also have a relatively low melting point in order to melt away without causing danger if an accidental short-circuiting should occur when inserting nails or the like. To satisfy these requirements a lead/tin/antimony alloy having a melting point of about 220° C., a thickness of about 0.015 mm. and a resistivity of about 0.15 ohm mm.$^2$/m. may be used, a melting point of 220° C. being sufficiently low for the purpose mentioned and at the same time well above the normal operating temperature of the element.

The web shown in FIG. 2 is composed of two heat-sealed layers of plastic laminate with an intermediate resistance foil 1 having slots as shown. It is believed to be evident that heating elements as shown in FIG. 1 may be produced from a web as shown in FIG. 2 by severing along the lines 9, separating the plastic layers 2 and 3 at the ends of the severed pieces, trimming the foil at the ends, applying the electrical connection 6 which bridges the area 5, and the connections 7, and sealing the insulating layers along the marginal end portions.

To enable the plastic layers to be separated at the ends when the continuous composite web has been severed, so as to permit the electrical connections to be effected, the layers are not sealed to each other in the areas indicated at 10.

Two composite webs may be connected for instance by welding or gluing in order to produce larger heating elements. If the insulating layers 2 and 3 consist of a plastic laminate which is heat-sealable on one side only, they may be placed in laterally off-set positions so as to provide free portions of heat-sealable material along one or both longitudinal edges of the resulting composite web.

In FIG. 3 it is shown how the lowermost plastic layer 2 may project laterally beyond the uppermost layer 3 along one of the longitudinal edges. If the layers 2 and 3 of plastic material are of the same width, the layer 3 will project laterally beyond the layer 2 along the opposite longitudinal edge.

A similar combination of the webs may also be effected at the same time as the insulating foils on opposite sides of the resistor are sealed to each other, whereby available widths of insulating foil material will not impose any limitation upon the width of the composite web.

The resistor 1 of the composite web shown in FIG. 2 is made from two continuous webs of foil material by making of narrow longitudinal slots 11. The slots are periodically interrupted over short areas, and the interruption takes place alternately in a first set consisting of every second slot, and in a second set consisting of the remaining slots. Each slot extends over a length approximately equal to the length of two heating elements.

The reason for using two foil webs is the open area 5 for attaching the heating elements. If such an area is superfluous, a correspondingly larger foil web may of course be used. It will be understood that it is also possible to make a wide slot corresponding to the area 5 in a single wide foil web, but such a procedure will entail a substantial waste of foil material.

FIG. 4 illustrates diagrammatically how a composite web as shown in FIG. 2 may be produced. A foil web 12 (or two contiguous foil webs, respectively) is fed through a station in which longitudinal interrupted slots are produced, and which may by way of example comprise two sets of knives 13 and 14 acting against a roller 15 over which the foil web 12 is passed, and at which the edges of the slots are cut so as to produce strips 16, and a knife or a stamp 17 which severs the strips at both ends. Immediately beyond the stamp 17 a layer of a plastic laminate 18 is applied to the slotted foil web from either side. The side of the plastic laminate facing the foil web is heat-sealable, and the plastic webs are made to adhere to each other through the slots and outside the edges of the resistance foil by a heating means, e.g. two co-operating ironing members 19, which are electrically heated and are movable towards and away from each other to and from an operative position. The composite web is further pressed together and advanced by a pair of rollers 20. The web may be passed directly to a location where it is severed and where the electrical connections are applied, or it may be coiled in order to be completed later.

In the embodiment of the invention illustrated in FIG. 4 rotating sets of knives 13 and 14 are used for cutting the slots 11. These sets of knives are illustrated in more detail in FIGS. 5 and 6. The set of knives 13 is mounted on a shaft 21 and the set of knives 14 on a shaft 22. In operative position each knife projects into a groove 23 in the roller 15, over which the foil web 12 is passed. The roller 15 is mounted for lateral movement as indicated by a double arrow in FIG. 4. Movement of the roller in one direction will cause the web to move so that one set of knives becomes inoperative, and movement in the opposite direction will cause the other set of knives to become inoperative. In the central position both sets of knives will act upon the foil for cutting slots 11 in the latter. Apart from the slot-cutting knives, knives for trimming the edges of the foil may be mounted on one of the shafts 21, 22 or divided on both shafts. These edge knives should have a greater diameter than the remaining knives and project into correspondingly deeper grooves in the roller 15, so that they will act upon the foil even when the roller 15 is in such a position that the remaining knives on the shaft concerned do not reach the foil.

In the embodiment shown in the rotating knives project freely into the grooves 23 in the roller 15 which is freely mounted and therefore will rotate. It is also feasible to make the grooves 23 coact with the knives in a shearing action. The knives may be bevelled on the side shown in FIGS. 5 and 6, or on the opposite side or on both sides depending upon what is found most adequate in order to prevent the cut-out strips 16 from being retained between the knives. To this end the strips may also be held down by pieces of wire or tongueshaped strips 25 projecting between the knives of each pair and being freely mounted on the shafts 21 and 22.

When the roller 15 is moved laterally, the distance between the same and the stamp 17 will change. Therefore a resiliently mounted tensioning roll 118 should be provided beyond the roller 15.

When the strips are cut along the edges thereof in the manner described, the marginal portions of the remaining foil tend to be bent downwards, and this may cause irregular edges of the resistor in the finished mats. In order to ensure that any bent marginal portions of the tortuous resistor are straightened out, the slotted foil should be passed over an edge 117. The tensioning roll 118 is preferably arranged so as to cooperate with the edge so as to ensure that the foil is always bearing against the edge 117.

As the sets of knives 13, 14 and the stamp 17 in the apparatus diagrammatically shown in FIG. 4 are staggered in the direction of feed, it will be understood that the moments at which the stamp 17 comes into operation, must be staggered in time relative to those movements of the roller 15 which cause the interruption of the cutting along the edges of the slots. When the making of the slots is to start after an interruption, the roller 15 is moved to the central position, whereby the set of knives which had been put out of operation, will again start longitudinal cutting of the foil. When these cuttings reach the stamp 17, the latter is made operative to cut off the strips. The extremity of these strips may then be disengaged from the stamp, for instance by a jet of pressurized air, so that the strips will hang down as shown at 16 in FIG. 4. When the making of the slots of one set is to be interrupted, the appropriate set of knives is rendered inoperative. These knives will then cease cutting along the strip edges, and the ends of the strips hanging down from the foil may be severed either by the stamp 17 or by means of a hot wire 17' positioned immediately below the foil web ahead of the stamp. It is also feasible to pass the strips which have been cut out along the edges, through the stamp 17 along with the remaining foil 12, so that the strips 16 will fall down at the rear side of the stamp.

The electrically heated ironing members 19 are movable towards and away from each other as indicated by two double arrows in FIG. 4. When the areas in which no welding is desired, are passing between the ironing members, the latter are retracted from the composite web.

The ironing members 19 are shown as an example of how the sealing may be performed. The heat necessary for welding heat-sealable insulating webs may also be produced by for instance high frequency current. When choosing a suitable material for the insulating webs 18 these can also be sealed by means of ultra-sound.

FIGS. 7 and 8 show another construction of the ends of a heating mat produced in accordance with the invention. In this construction the resistance foil 1 is coextensive with the insulating layers 2 and 3 at the ends and the areas 10 (FIG. 2) have been omitted. However, as the insulating layers do not project beyond the terminal edge of the resistance foil, the latter must be insulated at these edges in another way, for instance by an insulating tape 26 which is preferably an adhesive tape. Further, the connection 6 between the resistor parts and the connection of the cable 8 to the outer ends of the resistance foil must be provided outside the sheets insulating the resistor and insulated in some other way. In FIG. 7 the copper strip 6 and short copper strips 27 are inserted through slits 28 cut in the plastic layer 3. The strips 6 and 27 may be soldered to the resistance foil 1 by means of heating dies, the strips being coated with soldering tin on the side facing the resistance foil and the soldering being performed through the plastic layers 2 and 3 at a temperature which is not injurious to the insulating webs. Each of the strips 27 may in advance be soldered to the ends of conductors 29, 30 of an electric cable having a sheath 31 for instance of plastic material or rubber.

The copper strips 6 and 27 are insulated by means of a large insulating tape 32 which is applied along the edge of the heating element, and through which the insulating cable 8 projects substantially in the middle. The sheath 31 of the cable is split into flaps 33 and 34 on either side of the heating element outside the tape 32. An additional small piece 35 of insulating tape holds the flaps 33 and 34 and strengthens the attachment of the cable to the heating element.

It will be understood that no substantial difficulties are encountered in synchronizing the operation of the various components of the apparatus, such as the roller 15, the stamp 17 and, if desired, the ironing means 19 in accordance with the feeding rate. However, the method according to the invention offers such great advantages when compared with a manual application of a strip in a tortuous path, or any known non-continuous method, that it entails a significant progress even if the various means of the apparatus are operated manually, for instance while temporarily interrupting the feed, and even if the feeding rate is relatively low.

A substantial advantage resides in the fact that a bare resistance foil may be used for the web 12 in carrying out the method in accordance with the invention. However, the invention also includes the use of a laminated resistance coil, e.g. a metal foil which is reinforced by for instance a paper web. In contrast to the previous proposal of pasting a foil sheet to a supporting layer, the slots according to the invention will also extend through the reinforcing layer, and a supporting and insulating layer is applied to both sides of the slotted web.

It should be evident that the layer of resistance material does not have to be a self-supporting metal foil, but may consist of conductive particles or filaments applied to or embedded in a supporting foil or fabric. It is sufficient if the foil to be slotted comprises a layer of resistance material, and the term resistance foil as used in the present specification is intended to cover all possible variations in this respect.

As previously mentioned hot wires may be used instead of rotating sets of knives for cutting and severing the strips 16. The thickness and the temperature of these wires must be adapted to the melting temperature of the foil and the desired rate of production.

We claim:

1. A coilable blank in the form of a composite web severable at spaced-apart areas for forming thin, flexible, insulated, low temperature electrical heating mats, said blank comprising a width of thin resistance foil of uniform thickness and normally flat, from which a first set of numerous narrow longitudinal slots of uniform width are cut out, and a second set of corresponding slots of uniform width arranged respectively between the slots of the first set are also cut out, the slots in each set being interrupted over said spaced-apart areas which are located approximately midway between the interruptions of the other set, the slots serving to define sinuous windings of the foil of uniform width, said thus-slotted foil web having applied to each surface thereof a continuous web of flexible insulating material of a width sufficient to cover the resistance foil web and the insulating webs being adhered to each other over substantially the entire areas of their directly opposing surfaces, thereby to form the coilable composite web, the windings of the foil however being substantially free of adhesion to the insulation webs, and the insulating webs thus providing passages therebetween of the same width as the windings respectively.

2. A thin, flexible blank in the form of a composite sheet for forming an insulated, low temperature electrical heating mat, said blank comprising:

(a) a sheet of thin resistance foil of normally flat uniform thickness, the sheet material being removed in a first set of numerous narrow parallel slots of uniform width extending from one end of the foil over the major part of the length of the foil, and also in a second set of similar slots extending from the end of the foil opposite of the said one end and in between the slots of the first set, the slots serving to define sinuous windings of the foil of uniform width; and (b) two sheets of flexible, insulating material of a width greater than that of the resistance foil sheet and covering each surface thereof, the insulating webs being adhered to each other through the slots of the resistance foil and outside the lateral edges thereof to form the flexible composite sheet, the windings of the foil, however, being substantially free of the adhesion to the insulating webs, and the insulating webs thus providing passages therebetween of the same width as the windings respectively.

3. A thin flexible, insulated, low temperature electrical heating mat comprising:

(a) a resistor consisting of a sheet of normally flat thin resistance foil of uniform thickness, the resistance sheet material being removed in a first set of numerous narrow parallel slots of uniform width extending from one end of the resistance foil over the major part of the length of the said foil, and also in a second set of similar slots extending from the end of the said foil opposite the said one end and in between the slots of the first set, the slots serving to define sinuous windings of the foil of uniform width;

(b) two sheets of flexible, insulating material of a width greater than that of the resistance foil sheet and covering each surface thereof, the insulating webs being adhered to each other through the slots of the resistance foil and outside the lateral edges thereof to form of flexible composite mat, the windings of the foil, however, being substantially free of adhesion to the insulating webs, and the insulating webs thus providing passages therebetween of the same width as the windings respectively;

(c) means for insulating the end edges of the resistance foil; and (d) means for connecting the opposite ends of the sinuous windings to the main voltage.

4. A heating mat according to claim 3, wherein the resistor consists of a plurality of contiguous resistance sheets, the width of the said insulating webs being greater than the total width of the said parallel resistance sheets, the sinuous windings of the resistance sheets being connected in series.

5. A heating mat according to claim 3, wherein the insulating webs extend beyond the resistance foil sheet at the ends thereof for insulating the end edges of the sinous windings.

6. A heating mat according to claim 3, wherein the end edges of the resistance foil are flush with the end edges of the insulating sheets and the means for insulating the end edges of the sinuous windings is constituted by an adhesive strip.

7. A heating mat according to claim 3, wherein the insulating sheets are of a plastic laminate, the layer thereof facing the resistance foil being heat-sealable, while the outer layer is made of plastic material having the required characteristics with respect to electrical insulation and withstanding the temperature required to heat-seal the heat-sealable layer.

References Cited

UNITED STATES PATENTS

| | | | |
|---|---|---|---|
| 1,950,124 | 3/1934 | Samuels | 219—529 |
| 2,361,374 | 10/1944 | Abbott | 174—117 |
| 2,600,486 | 6/1952 | Cox | 338—212 |
| 2,610,286 | 9/1952 | Cox | 338—214 X |
| 2,715,674 | 8/1955 | Abbott et al. | 219—212 |
| 2,719,213 | 9/1955 | Johnson | 338—212 |
| 2,952,728 | 9/1960 | Yokose | 174—117 X |
| 3,020,378 | 2/1962 | Eisler | 219—549 X |
| 3,193,664 | 7/1965 | Beery | 219—549 |
| 3,213,521 | 10/1965 | Owers | 219—528 X |

FOREIGN PATENTS

| | | |
|---|---|---|
| 499,032 | 2/1951 | Belgium. |
| 1,323,543 | 3/1963 | France. |
| 701,304 | 12/1953 | Great Britain. |
| 747,511 | 4/1954 | Great Britain. |

RICHARD M. WOOD, *Primary Examiner.*

V. Y. MAYEWSKY, *Assistant Examiner.*

UNITED STATES PATENT OFFICE
CERTIFICATE OF CORRECTION

Patent No. 3,336,557                                    August 15, 1967

Olav Gerhard Lund et al.

It is hereby certified that error appears in the above numbered patent requiring correction and that the said Letters Patent should read as corrected below.

In the heading to the printed specification, line 5, for "Robert Meinich, Oslo, Norway" read -- Patentkonsortiet Robert Meinich & Co., Oslo, Norway, a corporation of Norway --; column 2, line 69, after "view" insert -- along --; column 4, line 66, strike out "in"; column 7, line 36, for "of flexible" read -- a flexible --.

Signed and sealed this 7th day of January 1969.

(SEAL)
Attest:

Edward M. Fletcher, Jr.                                EDWARD J. BRENNER
Attesting Officer                                      Commissioner of Patents